United States Patent [19]

Carlomagno et al.

[11] Patent Number: 5,143,272
[45] Date of Patent: Sep. 1, 1992

[54] DESOLDERING DEVICE

[75] Inventors: Michael Carlomagno, Redwood City; Paul F. Busch, Palo Alto, both of Calif.; Steven James, Portland, Oreg.

[73] Assignee: Metcal, Inc., Menlo Park, Calif.

[21] Appl. No.: 727,451

[22] Filed: Jul. 9, 1991

[51] Int. Cl.$^5$ .............................. B23K 1/018
[52] U.S. Cl. ........................... 228/20; 228/52
[58] Field of Search .............. 228/119, 191, 264, 125, 228/20, 52; 219/229; 29/764

[56] References Cited

U.S. PATENT DOCUMENTS

| | | | |
|---|---|---|---|
| 3,910,479 | 10/1975 | Köhler | 228/20 |
| 3,987,954 | 10/1976 | Litt | 228/20 |
| 4,318,504 | 3/1982 | Rauchwerger | 228/20 |
| 4,804,129 | 2/1989 | Brown et al. | 228/20 |

OTHER PUBLICATIONS

Pace Incorporated Catalog, pp. 8, 31, 34, 37.

Primary Examiner—Samuel M. Heinrich
Attorney, Agent, or Firm—Howard L. Rose

[57] ABSTRACT

A desoldering tool has a removable heater cartridge and a base unit having an assembly interior including a solder collection chamber and a removable vacuum source for developing a vacuum in and above the chamber and a removable porous solder retention pad located between the vacuum source and the solder collection chamber, the cartridge having a temperature self-regulating heater therein, a tail pipe extending from a hollow tip of the cartridge to a position above the solder collection chamber, and a vacuum seal between the cartridge and the base unit to maintain the vacuum and reduce transfer of heat from the tip. The tool is readily converted to a soldering iron or a hot air gun.

7 Claims, 3 Drawing Sheets

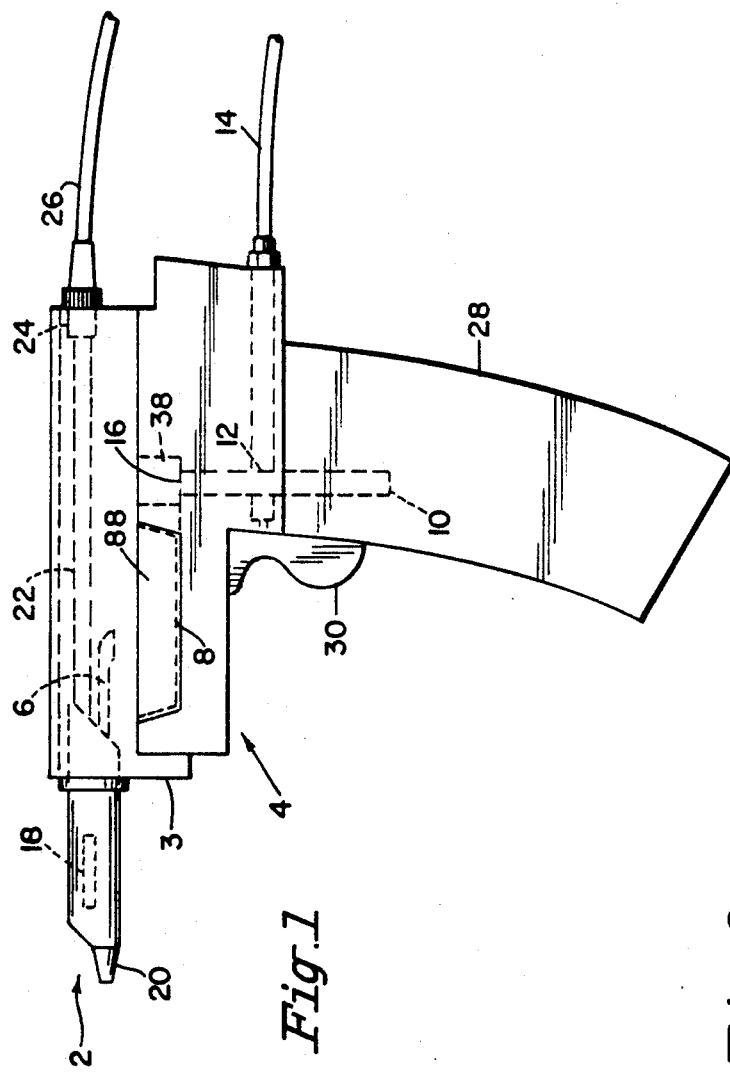
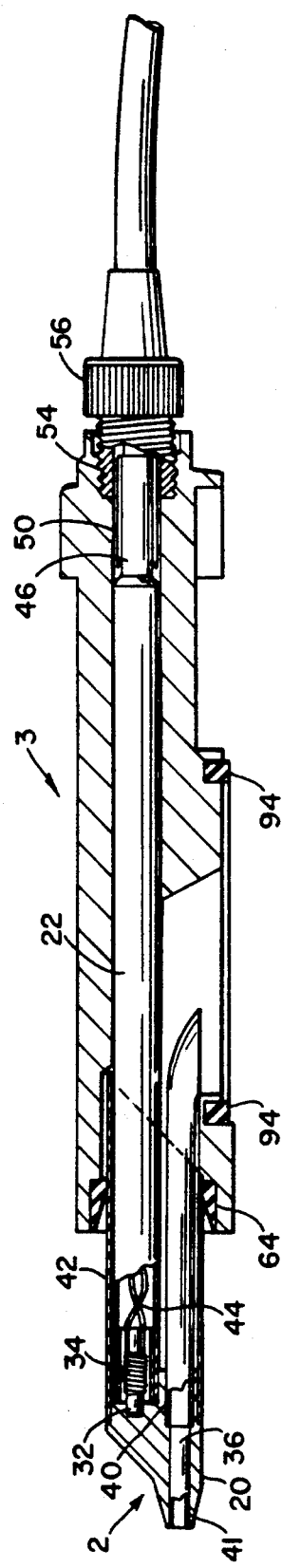
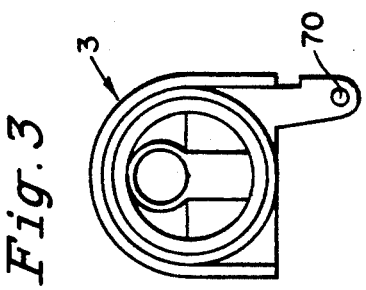
Fig. 1
Fig. 2
Fig. 3

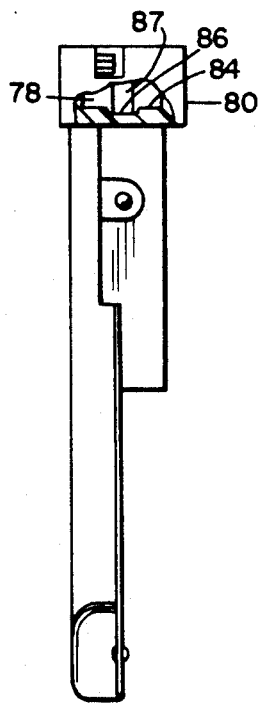
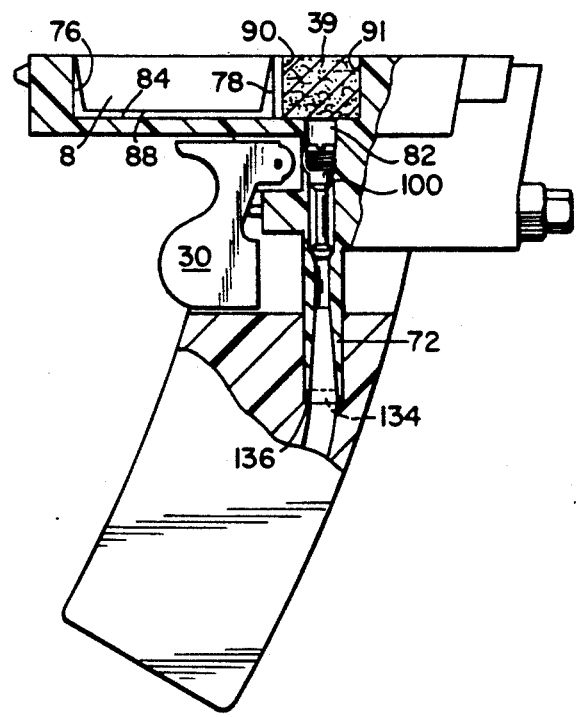
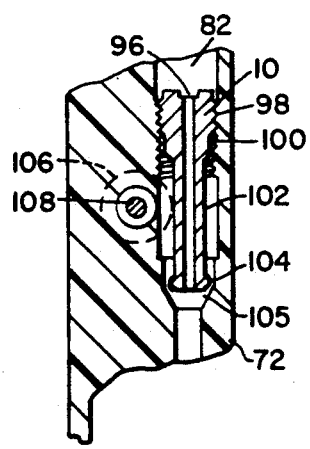
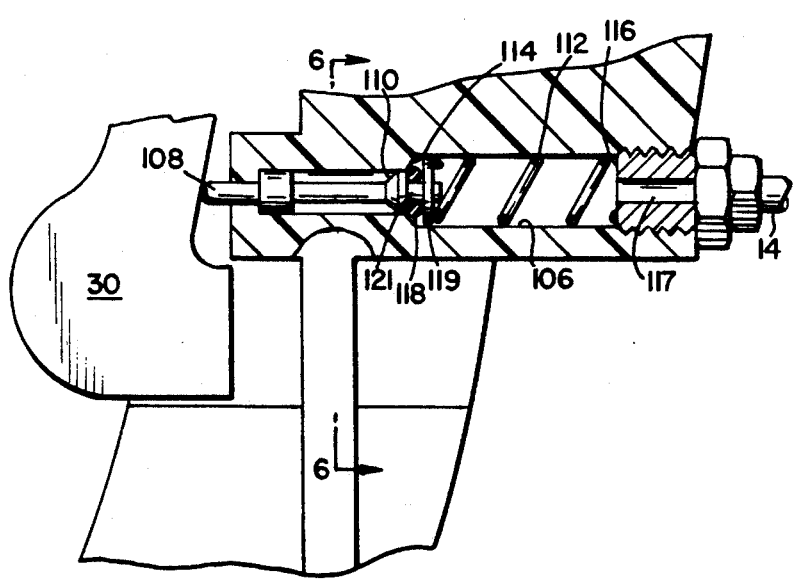

5,143,272

DESOLDERING DEVICE

BACKGROUND OF THE INVENTION

The present invention relates to desoldering equipment and, more particularly, to a desoldering tool employing a solder collection tray with a disposable liner and replaceable major components.

Desoldering equipment is employed, among other reasons, to remove electrical components from circuit boards or the like. The prior art has developed numerous different types of desoldering tools which typically include a source of heat, a source of vacuum and a reservoir for solder. These prior art tools suffer from one or more of the following disadvantages: insufficient power or overpower so that removal of an element from a board is quite difficult, or the board is damaged; the tool becomes hot to the hand of the operator, and often they are cumbersome and awkward to use; and, most importantly, the tips become clogged and the tools are difficult to maintain and remove accumulated solder and resin therefrom. Specifically, flux, resin and solder tend to accumulate inside the tips and the tool and reduce collection passage sizes, as well as fouling the collection chamber and vacuum source.

BRIEF DESCRIPTION OF THE PRESENT INVENTION

This application is related to U.S. Pat. No. 5,007,574 assigned to the same assignee as the present invention. The present invention provides a desoldering tool having a base unit and replaceable heater cartridge, venturi vacuum source and solder collection tray liner; the heater cartridge being easily slid in and out of the base unit; the cartridge having a rearwardly extending pipe, a tail pipe that is in communication with the tip of the cartridge at the front of the tool and which extends to a position above the solder collection tray; the tip being of copper; a liner of the solder collection tray being removable and porous, with a vacuum being developed in a space under the liner and communicating through the tail pipe to the tip of the tool; the region of and above the tray being sealed relative to ambient so that vacuum is maintained. The heater of the invention is preferably a temperature self-regulating heater, see U.S. Pat. Nos. 4,256,945 or 4,745,264, or the like, embedded in the copper tip of the cartridge. The passage at the front of the tip is lined with an abrasion resistant solder wettable material. The descriptions of Curie point autoregulation of said patents are incorporated herein by reference.

The top of the tool may be opened to replace the collection tray liner and to clean, replace or repair the vacuum-producing venturi. The cartridge, as it ages and becomes less effective, is simply slid out of the front of the base unit and a new cartridge slid into its place. As indicated above, the venturi and liner may also be replaced so that all functioning parts are replaceable.

The use of a removable cartridge permits cartridges of different designs and temperatures to be employed for different configurations of components to be removed and the areas surrounding the components. Further since the heater connection is achieved by simply sliding the cartridge into the tool the desoldering tip may be replaced with a soldering iron tip in which event the vacuum source would not be activated by the operator.

The tool may also be used as a hot air gun. The insert which produces the vacuum may or may not be removed but in either event the end of the passage remote from the solder collection tray and in which the vacuum producing insert is located, is plugged. In such event air is forced to flow out of the tip and with the heater on the tool becomes a hot air gun.

OBJECTS OF THE INVENTION

A principal object of the present invention is to provide a desoldering tool having a long life.

It is a further object of the present invention to provide a desoldering tool in which all major components are readily replaceable.

It is another object of the present invention to provide a base unit having a solder collection chamber and a heater cartridge, venturi assembly and chamber liner, all of which may be quickly and easily replaced.

Yet another object of the present invention is to provide a desoldering tool in which transfer of heat from the source of the heat to the handle of the device is greatly reduced, relative to prior art devices.

Still another object of the present invention is to provide a temperature self-regulating heater employing Curie point control, whereby the temperature of operation may be changed by changing heater cartridges, and the temperature is relatively constant without external controls.

A still further object of the present invention is to provide a tool that employs removable cartridges which may be a desoldering tool used in conjunction with a selectively actuable vacuum source or may be a soldering iron or other heating device.

BRIEF DESCRIPTION OF THE DRAWINGS

FIG. 1 is an artist's rendition of a side view of the desoldering tool of the present invention;

FIG. 2 is a side view in cross-section of the cartridge and the top part of the tool;

FIG. 3 is a front end view of the top part of the base unit;

FIG. 4 is a side view in cross-section of the bottom part of the base unit;

FIG. 5 is a front end view of the bottom part of the base unit;

FIG. 6 is a view illustrating the position of the air control valve relative to the venturi assembly;

FIG. 7 is a cross-section view of the air control valve; and

DETAILED DESCRIPTION OF THE INVENTION

Figure 8:
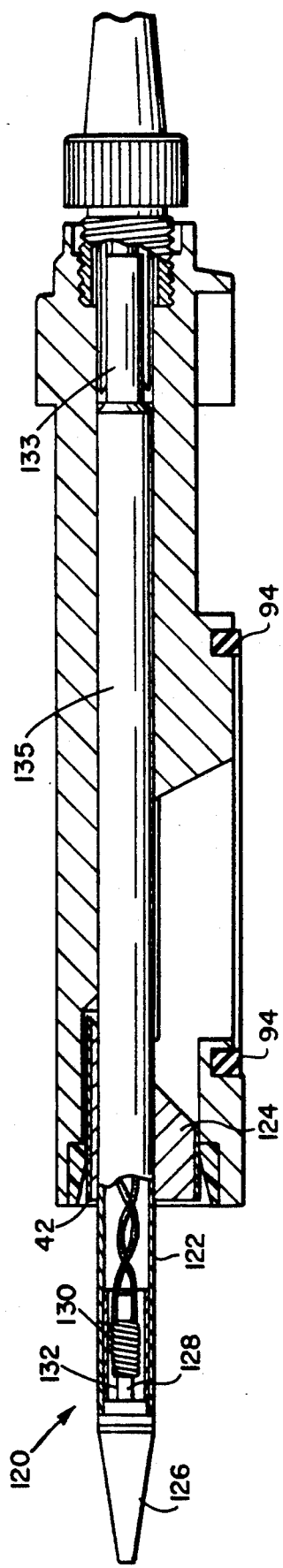
FIG. 8 is a cross-section view of a soldering iron cartridge and the top part of the tool.

Referring specifically to FIG. 1 of the accompanying drawings, there is illustrated an artist's rendition of the essential elements of the desoldering tool of the present invention.

Cartridge 2 is disposed in an upper member 3 of a base unit 4 with a tail pipe 6 disposed over solder collection tray 8 having a liner 88. Venturi assembly 10 has port 12 connected via tube 14 to a source of pressurized air and a second port 16 at which is developed a vacuum. Port 16 is in communication with a chamber 38.

A heater 18 is embedded in copper tip 20 of cartridge 2, and is connected via a coaxial conductor disposed in a hollow shaft 22, and slip fit coaxial connector 24 to a further cable 26, and thence to a source of high frequency, constant current if a heater of the prior mentioned patents is used.

Lower member 28 of base unit 4 is fitted with trigger 30 which when activated, causes a vacuum to be developed below chamber 38.

Referring now specifically to FIGS. 2 and 3 of the accompanying drawings, there is illustrated cartridge 2 and upper member 3 of base unit 4 of the desoldering device of the present invention. Cartridge 2 has, as indicated, tip 20 of copper, in which is embedded heater 18 of FIG. 1, comprising cylinder 32 of high mu material surrounded by coil 34. Tip 20 is bored, as at 36, and receives liner 41 in the front end region of the bore; the material of sleeve or liner 41 being fabricated from an abrasion-resistant solder wettable material to prolong the life of tip 20 and provide good thermal contact between tip 20 and solder. Tail pipe 6 is fitted into enlarged bore 40 in the back of tip 20, in communication with bore 36. The tail pipe is made of a solder non-wettable but heat conductive material such as aluminum.

Copper tip 20 of cartridge 2 is fitted into sleeve 42 of a relatively non-heat conductive metal, such as stainless steel of the 300 Series, whereby to isolate upper member 3 and base unit 4 from heated tip 20. To complete cartridge 2, coil 34 is connected via wires 44 to male coaxial connector half 46; the wires extending through rigid tube 22 so that upon insertion of cartridge 2 into upper member 3 coaxial connector half 46 mates with female coaxial connector half 50, mounted at the rear of upper member 3 of base unit 4. Upper member 3 is threaded at 54 to receive threaded collar 56 that engages the right end, as viewed in FIG. 2, of female connector half 50, thus preventing separation of connector halves upon use of the tool.

Cartridge 2 is supported at its front or tip end by sealing ring 64. Sealing ring 64 is disposed between sleeve 42 and upper chamber 3 to provide an air seal between cartridge 2 and base unit 4. The seal may be molded about the cartridge. It should be noted that the sealing ring is sealed against sleeve 42 which as indicated above is a poor heat conductor and thus the seal is not subject to excessive heat so that it has an extended life.

Seal 94, FIG. 2, serves to provide an airtight seal between lower member 28 of base unit 4 and hinged upper member 3, when the unit is in operation.

FIG. 3 is a front view of upper member 3, illustrating its rectangular bottom half and semicircular upper half. Hinge 70 is secured to the right side, as viewed in FIG. 3, at the lower end of the rectangular member. As will become apparent subsequently, when it is desired to enter the interior of the tool, upper chamber 3 of base unit 4 is rotated about hinge 70 and the interior of base unit 4 is exposed. A suitable latch (not illustrated) secures the upper chamber to the base unit during use or storage.

Reference is now made to FIGS. 4 and 5 of the accompanying drawings. Base Unit 4, exclusive of top member 3, includes member 72 supporting solder collection chamber 8, which extends perpendicular to member 72. Chamber 8 is defined by end walls 76 and 78 and side walls not illustrated in section, but defined by outside walls 80 of chambers 8 and 38 in FIG. 5. Member 72 has a venturi arrangement for developing a vacuum in bore 82 under chamber 38. Chamber 38 is defined by endwalls 90 and 91 and sidewalls not illustrated in section, but defined by outside walls 80 of chambers 8 and 38 in FIG. 5. Filter 39 is insertable above bore 82 to reduce greatly the quantity of solder, resins, etc. that might otherwise enter the venturi structure. Bottom 84 of chamber 8 is recessed in its middle region, reference numeral 86, to provide direct air access to bore 82 through opening 87 in walls 78 and 90. Unrecessed bottom part 84 of chamber 8 provides support for solder collection tray 88 that catches and holds the solder. Recessed bottom 86 defines the floor of chamber 38

Reference is now made to FIGS. 6 and 7 for a description of venturi assembly 10. Member 72, as previously indicated, is provided with vertical bore 82, in which venturi assembly 10 is located. Venturi assembly 10 is screwed into bore 82 in handle 4 from the top as viewed in FIG. 4, and comprises screw head 96 below which is threaded region 98 that engages a corresponding threaded region in the wall of bore 82. Hollow cylindrical region 100 of member 10 extends below the threads, the outer surface of this region engaging the inner wall of bore 82. Below region 100, venturi assembly 10 is tapered inwardly to another hollow cylindrical region 102 of reduced diameter, which terminates in flared skirt 104. Bore 82 tapers inwardly adjacent skirt 104 to provide venturi region 105. Air is introduced into region 105 through air valve 106. Air flows downward through venturi region 105, causing a large reduction in pressure which is transmitted up through hollow venturi assembly 10 to the bottom of chamber 38.

Valve 106 is a simple push-rod type valve, as illustrated in FIG. 7, comprising rod 108, terminating in outwardly beveled end 110. Rod 108 is biased to the left, as viewed in FIG. 7, by compression spring 112 seated between inwardly tapered surface 119 of rod 108 and rear wall 116. O-ring 118 is seated between inwardly tapered wall 114 of air valve 106 and groove 121 of rod 108. Air from air hose 14 is directed to valve 106 via bore 117.

In operation, a power supply, not illustrated, (constant current if one of the heaters of the aforesaid patents is employed) is turned on to heat the tip of cartridge 2 via heater 18. Trigger 30 is squeezed to start air flow, after tip 20 is presented to a region to be desoldered. The melted solder is sucked up into hollow tip 20 and through the downwardly extending tail pipe 6. The solder is dropped onto collection tray 88 in chamber 8; the solder normally solidifying into pellets before falling onto collection tray 88, thus reducing fouling of the lines and other regions of the device.

Maintenance of the tool is extremely simple and convenient. First of all, the use of liner 88 greatly reduces the amount of cleaning and maintenance required. When collection tray 88 does become clogged to the extent that suction begins to fall off at tip 20, upper member 3 is released to rotate out of the way, and collection tray 88 is replaced. If, after extended use, the venturi region becomes affected by solder, resins or the like, venturi assembly 10 is removed from member 72, cleaned and, if necessary, replaced by a new unit. The part of venturi 10 that is a permanent part of member 72 may also be cleaned at this time. Cartridge 2 may also be replaced by simply pulling the cartridge out. The tail pipe is maintained clean of solder because it is maintained above solder melt temperature, slopes downwardly, and is made of a high thermal material such as aluminum.

For cleaning, the base unit 4 may be immersed in a solvent bath, since the electrical connection to the power supply is readily removed, and with it, all electrical danger.

Referring back to sleeve 42 and tube 22, both of these elements are made of low thermal conductors, so that there is no contact between high temperature elements and base unit 4 by materials fabricated from a good thermal conductor. In consequence, the tool may be employed for extended periods before it becomes hot enough to be noticeable. In this context, seal 64 also functions as a thermal barrier. Cartridge 2, as designed and illustrated herein, maintains tail pipe 6 which has the front end embedded in copper tip 20 at above solder melt temperatures throughout its length. Also, tail pipe 6 does not touch any part of base unit 4, and thus does not transmit material amounts of heat energy thereto.

The desoldering tool may operate at different temperatures by selections of the Curie temperature of the ferromagnetic material of heater 18. Presently, heaters of 600° F. and 700° F. are prepared, but other temperatures can be provided as desired. Thus, by simply changing cartridges, the tool may be used for various different desoldering functions Also, of course, depending upon specific functions, cartridges of different physical shapes, particularly that part contacting the solder to be removed, may be employed.

Referring now to FIG. 8 of the accompanying drawings, there is illustrated a cartridge that may be employed with the structure of the present invention and serve as a soldering iron. A basic soldering iron cartridge, generally designated by reference numeral 120 which may be of the type disclosed in FIG. 1 of U.S. Pat. No. 4,839,501 is included in a modified cartridge 122. The sleeve 42 of low thermal conductivity material again defines the outer periphery of the modified cartridge 122, the cartridge 120 in this instance located within the sleeve 42 in a body 124 also of low thermal conductivity material although other mechanisms for holding solder cartridge 120 within modified cartridge 122 are readily apparent.

The soldering iron cartridge 120 has a tip 126 including member 124 of a relatively poor heat conductive metal fitted into sleeve 42. A coil 130 is wound about a copper rod 128 coated with a thin ferromagnetic layer. The coil is connected via wires 131 to male connector member 133; the wires extending through rigid tube 135 having its left end, as viewed in FIG. 8, secured to the tip 120 and having the male connector member secured in its right end.

The description of cartridge 120 set forth in the aforesaid U.S. Pat. No. 4,839,501 is incorporated herein by reference.

If it is wished to convert the tool to a hot air gun, and reference is made to FIG. 4, the venturi assembly 10 is preferably removed from the member 72 but in either case a self tapping plug 134 is screwed into or otherwise fitted into the bottom of the bore 82. Now when the trigger 30 is pulled air under pressure is trapped and can escape only through the tip 20. If the heater is on, hot air is expelled.

It is not essential that the venturi assembly 10 be removed for this purpose but performance is better if it is since the pressure drop in the device is reduced.

Once given the above disclosure, many other features, modifications and improvements are thus to be considered a part of this invention, the scope of which is to be determined by the following claims.

We claim:

1. A desoldering tool having a base unit including upper and lower members securable to one another, a solder collection chamber located in the lower member, a selectively activatable source of vacuum in the lower member, a cartridge having a tip and an electric heater in said tip, the tip having a bore therethrough, the tip being removably secured in the upper member and having a hollow pipe communicating with the bore in the tip and extending over the solder collection chamber, characterized by a further chamber in communication with the source of vacuum,
a porous member removable disposed in said further chamber,
said solder collection chamber having a base surface with a channel formed therein extending into communication with said porous member, and
a solder collection chamber liner removably disposed in said solder collection chamber and seated on said base surface thereof.

2. A desoldering tool according to claim 1 wherein said cartridge comprises
a two part electrical connector,
a rigid hollow tube secured to said tip at one end and having one member of a two part electrical connector at the other end,
said electric heater having wires extending through said tube to said one member,
a second and mating member of said electrical connector disposed in said upper member of said base unit whereby said cartridge may be slid in and out of said upper member and upon insertion make electrical contact between said wires and said second member of said electrical connector.

3. A desoldering tool according to claim 2 further comprising
a soldering iron cartridge having a heater with wires extending through said hollow rigid tube to a first member of an electrical connector,
a second member of said electrical connector secured in said upper member of said base unit in line with said rigid tube whereby said soldering iron cartridge may be slid in and out of said tool and connected to said second member of said electrical connector.

4. A desoldering tool according to claim 1 further comprising
means for converting said source of vacuum to a source of gas under pressure.

5. A desoldering tool according to claim 1 wherein said source of vacuum comprises
a hollow member in said lower member of said base unit,
a further member disposed in said hollow member to provide a venturi region,
means for supplying air to said venturi region to create a partial vacuum, and
means for blocking said hollow member to create a pressure therein above ambient pressure.

6. A desoldering tool according to claim 5 wherein said member providing a venturi region is removable from said hollow member of said lower member of said base unit.

7. A desoldering tool according to claim 1 wherein said heater is a temperature self regulating heater.

* * * * *